SEMICONDUCTOR RECTIFIER WITH IMPROVED TURN-ON AND TURN-OFF CHARACTERISTICS

Original Filed Oct. 22, 1965 3 Sheets-Sheet 1

INVENTORS:
ANGELO L. DECECCO,
DANTE E. PICCONE,
ISTVAN SOMOS,
BY Albert S. Richardson Jr.
ATTORNEY INVENTORS:
ANGELO L. DECECCO,
DANTE E. PICCONE,
ISTVAN SOMOS,
BY Albert S. Richardson Jr.
ATTORNEY INVENTORS:
ANGELO L. DECECCO,
DANTE E. PICCONE,
ISTVAN SOMOS,
BY Albert S. Richardson Jr.
ATTORNEY United States Patent Office Re. 27,440
Reissued July 18, 1972

27,440

SEMICONDUCTOR RECTIFIER WITH IMPROVED TURN-ON AND TURN-OFF CHARACTERISTICS

Angelo L. De Cecco, Newtown Square, Dante E. Piccone, Philadelphia, and Istvan Somos, Lansdowne, Pa., assignors to General Electric Company Original No. 3,408,545, dated Oct. 29, 1968, Ser. No. 514,734, Oct. 22, 1965, which is a continuation-in-part of Ser. No. 385,323, July 27, 1964. Application for reissue Oct. 27, 1970, Ser. No. 84,550
Int. Cl. H01l 9/12
U.S. Cl. 317—235 26 Claims

Matter enclosed in heavy brackets [ ] appears in the original patent but forms no part of this reissue specification; matter printed in italics indicates the additions made by reissue.

ABSTRACT OF THE DISCLOSURE

The switching capabilities of a 4-layer broad area PNPN semiconductor device are dramatically improved by providing an electrode-less auxiliary region in one of the end layers in the vicinity of the small area where conduction begins, and by constructing and arranging the auxiliary region so that load current initially traversing it acts as a high-current peremptory trigger signal for the laterally-adjacent main region of broader area.

This is a continuation-in-part of our patent application S.N. 385,323, filed July 27, 1964, now abondoned.

This invention relates to a solid state electric current switch of the multilayer semiconductor type, and more particularly it relates to a silicon controlled rectifier known generally as a thyristor or SCR having improved switching characteristics.

Typically an SCR comprises a body of semiconductive material (silicon) having four distinct layers, with contiguous layers being of different conductivity types to form three back-to-back P-N (rectifying) junctions in series. A pair of main current-carrying electrodes (anode and cathode) are provided in low resistance (ohmic) contact with the end layers of the silicon body, respectively, and at least one control electrode (gate contact) is similarly connected to an accessible intermediate layer of the body. When connected in an energized electric circuit, the SCR will ordinarily block appreciable forward current flow between its anode and cathode until a small gate current of suitable magnitude and duration is supplied to the control electrode. The construction and operating theory of such a device are well known in the art, as are its limitations.

One of the recognized limitations of prior art SCR's is their inability safely to endure very high rates of rise of anode current (inrush current slope, or di/dt) during the turn-on process. For example, a typical prior art SCR would be in danger of destruction if di/dt were not limited by a reactor or the like in the external load circuit to less than 50 amperes per microsecond when switching from a forward blocking voltage of 700 volts. But higher di/dt ratings are necessary in some prospective SCR applications and are always desirable from the viewpoint of reducing the size and the expense of the external current limiting means.

We have found that an SCR fails when subjected to too high a di/dt because of localized overheating in the silicon body at a spot adjacent to the gate contact. This is the spot or "pinpoint" area where conduction starts, and burnout results if the heat that is generated here due to an initially high current density is excessive compared to the rate at which heat can be safely dissipated. The localized "hot spot" heating is also affected by the magnitude of applied voltage, and the maximum allowable di/dt of an SCR therefore decreases with increasing forward voltage ratings. At high switching frequencies (for example, above 400 turn-on-turn-off cycles per second), this turn-on property further deteriorates due to cumulative hot spot heating.

Localized hot spot heating also limits the safe di/dt rating of a conventional SCR when turned on in the forward "avalanche" mode. When operated in this mode, as is well known in the art, an SCR turns on in response to forward anode-to-cathode voltage increasing to a predetermined breakover magnitude ($V_{BO}$) even though no gate signal is applied. We have found that an SCR operating in this mode and subjected to too high a di/dt will fail at a particular spot or pinpoint area which is predictable either in the center of the silicon body or near its periphery.

When an SCR is required to conduct forward current for only a relatively short interval of time, as for example in high-frequency inverter applications, the amount of di/dt to which it is subject during the turn-on process may adversely affect its turn-off characteristics. In this case there is insufficient time for the above-mentioned hot spot to cool before the turn-off process begins, and the elevated temperature contributes to breakdown of the device at this point. We have found that an intervals of appreciable forward current (for example, 100-microsecond pulses of 300-amp. magnitude) the turn-off time of prior art SCR's is a direct function of turn-on di/dt. Efforts heretofore made in the art to increase the di/dt rating of SCR's have resulted in undesirably prolonging their minimum turn-off times.

A general object of the present invention is to increase the turn-on di/dt rating of a solid state controlled rectifier.

Another general object of this invention is to increase the di/dt rating of such a device and concurrently to enable shorter turn-off times to be realized.

A more specific object of the invention is the construction of a silicon controlled rectifier having a di/dt rating more than 10 times higher than that of commercially available prior art SCR's.

Yet another object is the provision of relatively high current and high voltage SCR's having improved turn-on and turn-off characteristics that enable them to perform successfully at high switching frequencies.

A further object is to increase the turn-on di/dt rating of a solid state NPNP semiconductor device that is turned on by avalanche breakdown.

In carrying out our invention in one form, a body of semiconductive material is disposed between spaced-apart contact surfaces of a pair of main electrodes. The semiconductor body has a plurality of layers arranged in succession with contiguous layers being of different conductivity types, whereby rectifying junctions are formed between the respective layers. A predetermined end layer of the body is connected to the contact surface of a predetermined one of the main electrodes, and the opposite end layer of the body is connected to the contract surface of the other main electrode. An intermediate layer of the body has a control electrode connected thereto. According to our invention, said predetermined end layer comprises a main region having a major face that is contiguous with the whole area of the contact surface of the predetermined main electrode, and a relatively small auxiliary region disposed laterally adjacent to said main region between the main region and the control electrode connection to said intermediate layer of the semiconductor body.

The aforesaid auxiliary region is so constructed and arranged that upon energization of the control electrode by a trigger signal to turn on the device, load current will initially traverse said auxiliary region and a significant fraction thereof will immediately transfer to a path through the intermediate layer that adjoins said predetermined end layer and through the rectifying junction that is formed between said adjoining layer and the main region of said predetermined end layer. The transferred fraction of load current bypasses said auxiliary region and acts as a relatively high-current trigger signal for the portion of said semiconductor body subtending the contact surface of said predetermined main electrode, thereby quickly and peremptorily causing a stepped transfer of the load current, before it can attain a damaging level, from the initially triggered pinpoint area that is adjacent to the control electrode connection to a relatively broad area of the semiconductor body that is next to a peripheral section of the main region of said predetermined end layer. After this second triggering action there are less watts to dissipate and a comparatively large area is available for dissipating them without localized hot spot heating. Consequently load current can safely proceed to rise abruptly and to spread across the whole area of said main region. Since no hot spot is formed during this two-step, double-triggering turn-on process, subsequent turn-off of the device is expedited.

In another aspect of the invention, the foregoing two-step turn-on process and its beneficial results are obtained in a device that turns on in the avalanche mode by making the auxiliary region of the device symmetrical with respect to the semiconductor body. This ensures that load current will initially traverse the auxiliary region even though conduction starts at a pinpoint area that is not adjacent to the control electrode of the device.

Our invention will be better understood and its various objects and advantages will be more fully appreciated from the following description taken in conjunction with the accompanying drawings in which.

Figure 1:
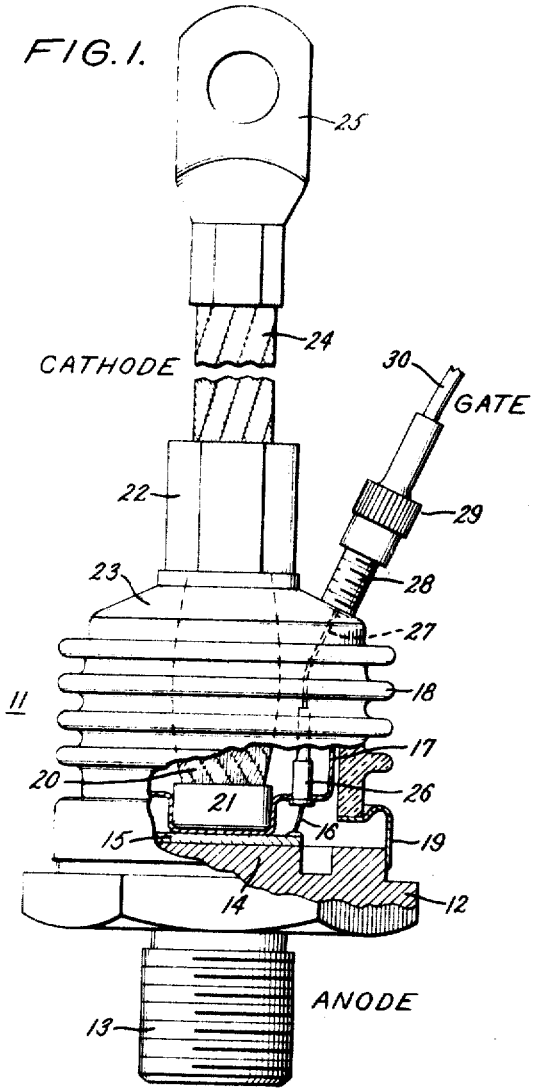
FIG. 1 is an elevational view of a silicon controlled rectifier comprising a hermetically sealed enclosure that is partly broken away in this figure to show the semiconductor device supported therein.

Referring now to FIG. 1, the hermetically sealed enclosure or housing 11 is seen to include a base member 12 that serves the combined purposes of anode terminal, thermal conductor, and supporting member. The base member 12 is made of good electrical and heat conducting material such as copper, and it provides a thermal path for conducting heat losses to the outside ambient. Toward this end it is provided with a threaded stud 13 for connection to a heat sink of any conventional form. The base member 12 is also provided with a circular mounting platform 14 having a centrally disposed flat surface portion on which a semiconductor device may be mounted and to which it may be connected for electrical and thermal conduction.

Supported centrally on the platform 14 is an electric component or device 15 that includes a body of silicon or other semiconductor such as germanium. As is shown in detail in other figures to be described hereinafter, this body comprises a 4-layer wafer having a control electrode or gate, thereby forming a silicon controlled rectifier known in the art as an SCR. As can be seen in FIG. 1, the device 15, which has a flexible gate lead 16, is sandwiched between the top surface of the mounting platform 14 of the base member 12 and the outside bottom surface of the closed end of a metallic cup 17. The anode of device 15 is connected to the mounting platform 14, while the cathode of the device is connected to the metallic cup 17.

The cup 17 and the remainder of the SCR enclosure 11 that is shown in FIG. 1 are preferably constructed and arranged in accordance with the teachings of a copending patent application S.N. 436,711, filed for D. B. Rosser on Feb. 12, 1965, and assigned to the assignee of the present application. Reference may be made to that source for the details of the enclosure that are omitted in its brief description here. It should be clearly understood that the particular enclosure design used to support and to house the semiconductor device 15 is immaterial to the practice of our invention, and FIG. 1 is intended for illustration purposes only.

As can be seen in FIG. 1, the illustrated enclosure 11 includes a cylindrical insulating body 18 having a metallic ring 19 bonded to its lower end. The ring 19 is joined to the base member 12 by brazing or the like. The upper end of the insulating body 18 is circumferentially joined and sealed to the open end of the metallic cup 17 by means of another ring not shown in FIG. 1.

A short length of stranded feed-in cable 20 has at its lower end a ferrule 21 that is electrically joined to the inside surface of the closed end of the cup 17. The upper end of the cable 20 extends into a tubular member 22 protruding from the crown of a metallic cap 23, the cap 23 being affixed to the upper end of the insulating body 18. Another length of power feed-in cable 24 is also inserted in the tubular member 22, and this member is securely crimped to both of the cables 20 and 24 by means of a suitable crimping tool. The external end of the cable 24 is provided with a conventional cable terminal 25 that serves as the cathode terminal of the illustrated SCR.

The gate lead 16 of the semiconductor device 15 is made accessible to external control circuits by way of a gate feed-through assembly 26, an insulated wire 27, and a coaxial connector receptacle 28. The feed-through assembly 26 extends through an appropriate hole in the metallic cup 17 to which it is hermetically sealed. The insulated wire 27 has one end electrically connected to the gate lead 16 by means of the feed-through assembly 26, and its other end is electrically connected to a center contact of the coaxial connector receptacle 28 which extends through a hole in the metallic cap 23. The shell of the receptacle 28 is connected to the cap 23 by brazing or the like, and it is adapted to receive a cooperating plug assembly 29 terminating a coaxial cable 30. Thus external connections from the wire 27 to a source of gate current are provided by means of the cable 30.

Figure 2:
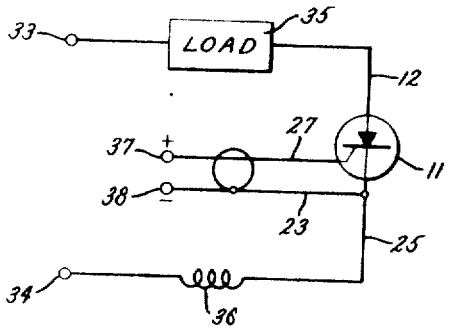
FIG. 2 is a schematic diagram of the silicon controlled rectifier connected in an electric circuit.

In FIG. 2, the above-described SCR is schematically illustrated in an electric circuit. This circuit comprises the serially connected combination of an electric power source represented by the terminals 33 and 34, an electric load 35, the anode and cathode terminals 12 and 25 of the SCR, and current limiting means 36. A trigger or turn-on signal is applied to the control electrode or gate of the SCR by a suitable source of current represented in FIG. 2 by terminals 37 and 38 which are respectively connected (by means of the coaxial connector 28, 29 shown in FIG. 1) to the wire 27 and to the cap 23 of the SCR enclosure 11. The wire 27 is electrically connected to the gate contact of the SCR, and the cap 23 is electrically connected to its cathode. With forward blocking voltage across the SCR (anode terminal positive), cathode current can be sufficiently increased by appropriate energization of the terminals 37 and 38 to cause the SCR to switch from a blocking or off state to a conducting or on state, whereupon the gate loses control until load current in the SCR is subsequently reduced below the holding current level and the device reverts to its forward blocking state. An SCR designed to conduct load current of several hundred amperes can be turned on by applying to its gate a small trigger signal of less than one-tenth ampere.

As was pointed out hereinbefore, load current in an SCR must not be allowed to exceed a prescribed maximum rate of rise (di/dt) during the turn-on process. For this reason suitable inductance 36 is provided in circuit with the SCR. Such current limiting means is often undesirable because of the cost and space that it involves and because it prolongs the turn-on time of the circuit. It could be eliminated or its size could be substantially reduced by using a semiconductor device 15 that is designed to have a relatively high di/dt rating, and this desirable result is achieved with remarkable success by the present invention.

Figure 3:
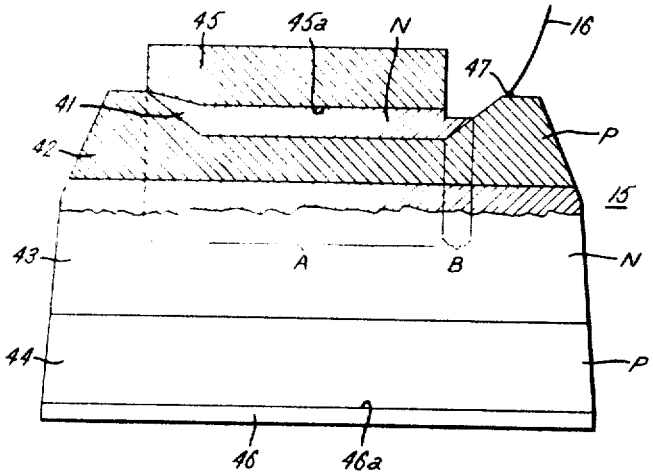
FIG. 3 is an enlarged elevational view, partly in section and not to scale, of a semiconductor device constructed in accordance with a preferred form of our invention, the device comprising a multilayer body of silicon with three electrodes connected thereto.
Figure 4:
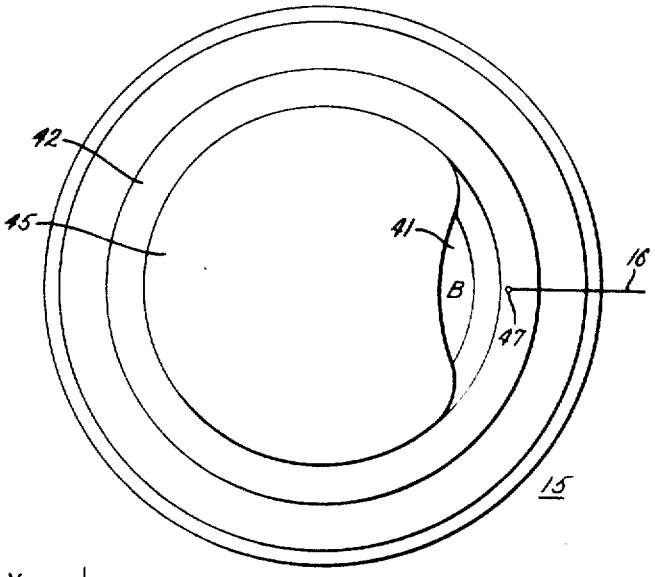
FIG. 4 is a plan view of the device shown in FIG. 3.

A preferred form of the present invention is illustrated in FIGS. 3 and 4. The device 15 shown therein is seen to comprise a wafer of silicon having four relatively thin, circular layers or zones 41, 42, 43, and 44 arranged in succession, with contiguous layers being of different conductivity types. For example, the end layer 41 comprises N-type silicon, the intermediate layer 42 that is contigous with layer 41 comprises P-type silicon, the next intermediate layer 43 comprises N-type silicon, and the other end layer 44 comprises P-type silicon. The interface boundaries between the respective layers of the wafer therefore form rectifying junctions. This NPNP wafer is disposed between two main current-carrying electrodes or metallic contacts 45 and 46 having parallel, spaced-apart contact surfaces 45a and 46a, respectively. The contact surface 46a of electrode 46 is superimposed on and bonded to the P-type end layer 44 of the wafer in a manner forming a low resistance ohmic junction therewith, and this electrode comprises the anode of device 15. The contact surface 45a of the electrode 45 is connected in a similar manner to the N-type end layer 41 of the wafer, and this electrode comprises the cathode of the device. An accessible portion of the [intermedite] *intermediate* P-type layer 42 and the gate lead 16 of the device 15 are ohmically interconnected by means of a control electrode or contact 47 located closely adjacent to the N-type end layer 41.

The above-described device 15 can be constructed by any of a number of different techniques that are well known in the transistor and silicon controlled rectier arts today. Typical parameters and dimensions wil be set forth hereinafter. While thin solid lines and distinct hatching have been used in FIG. 3 to illustrate the various interface boundaries in the device, those skilled in the art will understand that these boundaries are not such discretely definable plane surfaces in practice. The main electrodes 45 and 46 of device 15 are respectively adapted to be connected to the metallic parts 17 and 14 of the previously described enclosure 11 by any suitable means that will protect the fragile junctions of the device against thermal and mechanical stresses.

In order to increase the maximum safe di/dt rating of the device 15 relative to that obtainable in prior art devices, we have designed the end region 41 of the silicon wafer so that it has two distinctive, laterally adjacent portions. In FIGS. 3 and 4 these portions are indicated by the reference letters A and B, and hereinafter they will be referred to as the main region A and the auxiliary region B of the end layer 41. The main electrode 45 of device 15 is connected only to the main region A which has a major face that is contiguous and substantially coextensive with the whole contact surface 45a. The adjacent auxiliary region B is small relative to the main region A, and it is disposed between the main region and the gate contact 47. Being laterally displaced with respect to the contact surface 45a, the auxiliary region is free of main electrode connections.

The auxiliary region B is so constructed and arranged that upon energization of the gate contact 47 to turn on the device 15 load current will initially traverse this region and a significant fraction thereof will immediately transfer to a parallel path through the adjoining layer 42 of the silicon wafer and through the rectifying junction that is formed between 42 and the main region A of the end layer 41. By "significant fraction" we mean current of sufficient magnitude to act as a peremptory trigger signal for the portion of the wafer subtending the contact surface 45a of cathode 45 while load current is still confined to the relatively small initially triggered area in the device. As will be further explained below with the aid of FIG. 8, this nearly instantaneous transfer of current from the auxiliary region B of layer 41 to the parallel path including the rectifying junction between the main region A and the intermediate layer 42 is due to the provision of relatively high lateral resistance in the initial current path comprising the auxiliary region B, and it results in a double-triggering turn-on process during which localized hot spot heating in the silicon wafer is avoided.

While this result can be obtained by altering the electrical properties of the auxiliary region B relative to the main region A, we prefer to obtain it by geometry effects. Thus in FIGS. 3 and 4 it will be observed that the contact surface 45a of the cathode 45 is made non circular and asymmetrical, as is the conforming major face or surface of the main region A of the circular end layer 41 of the silicon wafer. The auxiliary region B is extended laterally beyond the edge of the associated surface 45a for a distance of at least two mils, measured from the periphery of the main region A toward the gate contact 47. The thickness of B is substantially reduced, being no more than 90 percent as thick as the adjoining portion of the main region A, and therefore its lateral resistance is appreciably higher than that of any part of the main region of corresponding lateral dimension. (The "thickness" of the region refers to its dimension [parellel] *parallel* to the direction of principal current flow between the main electrodes 45 and 46 of the device 15, and "lateral" refers to a direction oriented perpendicular thereto.)

With this construction the current that initially traverses the relatively thin auxiliary region B, upon energization of the gate contact 47 to turn on the device, causes a potential difference of substantial magnitude to develop in the end layer 41 between the main region A and the edge of the auxiliary region B that is closest to the gate contact 47. The beneficial effect of this voltage field will became apparent hereinafter. Devices built in accordance with the foregoing description have exhibited remarkably improved di/dt characteristics. For example, we have been able to subject such a device to a di/dt of 1500 amperes per microsecond and successfully turn it on from a 700-volt forward blocking condition. Representative parameters and dimensions of the device will be set forth for illustration purposes.

The intermediate N-type zone 43 of the silicon wafer that comprises the device 15 is a one inch diameter 5-mil thick layer of phosphorous-doped silicon having a resistivity of 40 ohm-centimeters. Extending across opposite sides of this layer are 3-mil thick P-type layers 42 and 44 of silicon with gallium diffused therein, the surface concentration of gallium being $10^{19}$ atoms per cubic centimeter. A main electrode 46 of aluminum is alloyed to the surface of the P-type end layer 44, and a 1-mil thick N-type end layer 41 of antimony-doped silicon (having a uniform concentration of $10^{18}$ antimony atoms per cubic centimeter) is alloyed to the P-type layer 42. The end layer 41 has a diameter of about five-eighths inch and is concentrically positioned on the adjoining layer 42, layer 41 being recessed in layer 42 so that the thickness of the P-type semiconductor extending under it is only 1.5 mils.

The other main electrode 45 of the device comprises a gold-antimony disc bonded to the N-type end layer 41. A peripheral portion of 45 is removed by etching. The etching process is so controlled as to also remove some of the surface of the end layer 41 exposed by the etching of the electrode 45. As indicated in FIGS. 3 and 4, the remaining exposed portion of 41 comprises its auxiliary region B which has a maximum thickness of about 0.4 mil and extends laterally about one-sixteenth inch from the main region A of the original layer 41. An aluminum gate lead 16 is welded at 47 to the intermediate P-type layer 42 of the wafter adjacent to the distal edge of the relatively thin auxiliary region B, the shortest distance therebetween being approximately 15 mils.

When the gate contact 47 is energized by a small trigger signal and the device 15 starts to conduct load current supplied by a circuit in which current is able to increase at a rate of 1500 amps per microsecond, the voltage across the main electrodes 45 and 46 abruptly drops from the forward blocking voltage magnitude of 700 volts to a level of approximately 400 volts, and a momentary potential difference of about 300 volts can be measured between electrode 45 (the cathode) and contact 47 (the gate). Approximately 0.3 microsecond after conduction starts, a second triggering action takes place in the device 15 whereupon the gate-cathode potential difference collapses and the anode-cathode voltage proceeds to delay at a relatively rapid rate to the magnitude of the characteristic forward voltage drop of the device while fully on. During the latter interval current will laterally spread from a peripheral section of the main region A to the end layer 41 across the whole area of the P-N junction between layers 41 and 42 until a state of uniform current density is reached and the device is fully on.

Figure 5:
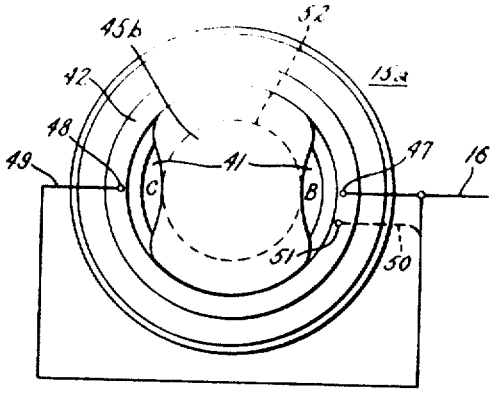
FIG. 5 is a plan view of a similar device that embodies an alternative form of the invention.
Figure 6:
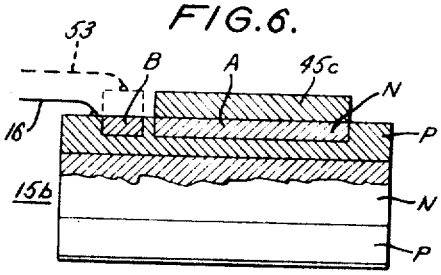
FIGS. 6 and 7 are elevational and plan views, respectively, of another embodiment of the invention.
Figure 7:
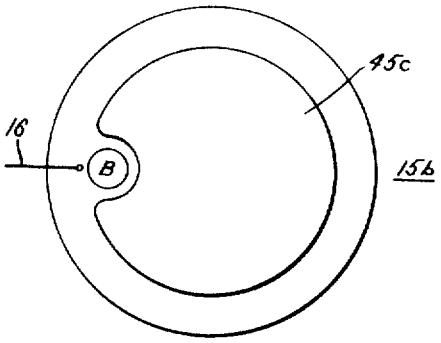

Other practical embodiments of our invention are illustrated in FIGS. 5–7. As is shown in FIG. 5, the circular end layer 41 of a semiconductor device 15a includes a second relatively thin auxiliary region C that is similar to the above-described region B except for being located on the diametrically opposite side of the layer 41. A peripheral portion of the main electrode 45b of the device 15a is removed above the region C so that it too is free of main electrode connections. The auxiliary region C is disposed between the main region A (the portion of the layer 41 on which the electrode 45b is superimposed) and a second control electrode or gate contact 48 that is connected to the adjoining layer 42 of the device. By means of a wire 49 the gate contact 48 can be electrically connected to either the gate lead 16 or a separate source of gate current (not shown), or as indicated by a broken line 50 in FIG. 5, it can alternatively be connected to a third gate contact 51 located on the same layer 42 adjacent to the distal edge of the auxiliary region B. If simultaneous operation of a plurality of parallel-connected NPNP wafers were desired, the gate contact 51 could conveniently be connected to the gate lead of one or more additional devices. The device 15a of FIG. 5 is intended to be otherwise the same as the device 15 previously described with reference to FIGS. 3 and 4.

The provision of at least one additional gate contact 48 and the triggering action it effects when energized will expedite current spread in the device 15a during the turn-on process, thereby further improving the switching characteristics of our SCR. Concurrent triggering actions at the respective gates are assured by tying them together as shown. This is because of the substantial potential difference that momentarily develops across the auxiliary region adjacent to whichever one of the gates initially triggers the device. Such potential difference immediately produces at the opposite gate a relatively large trigger signal that forces turn-on there. If the trigger signal for the second gate 48 is taken from the third gate 51 with no direct connection to the first gate 47, the auxiliary region C may be omitted because the triggering action effected by the second gate will always occur at a time when the impressed voltage (and hence the heating that accompanies this triggering action) is greatly reduced.

The device 15a shown in FIG. 5 can be further modified by making the relatively thin auxiliary region B annular, as is indicated by the broken-line circle 52. In this modification the cathode 45b is circular and overlies only that portion (the main region A) of the end layer 41 encompassed by the broken line 52. The auxiliary region B circumscribes the main region A. One or more gates can be used. We believe this configuration enhances the characteristic turn-off properties of the device. As a possible alternative, the annular auxiliary region B could extend radially inwardly with respect to a ring-like cathode, with the gate contact being centrally disposed within the area circumscribed by this region.

In the embodiment of our invention that is illustrated in FIGS. 6 and 7, the N-type end layer of the semiconductor device **15*b* comprises a main region A and a relatively small auxiliary region B disposed laterally adjacent thereto. The main region A has a surface contiguous and coextensive with the cathode 45c, while the auxiliary region B is laterally displaced therefrom. As it is shown in FIGS. 6 and 7, the auxiliary region B, like the corresponding auxiliary regions of the previously described embodiments, is characterized by a surface discontinuity with respect to the main region A, but here its increased lateral resistance is obtained by introducing a gap in the layer instead of by reducing its thickness. The gate lead 16 is connected to the intermediate p-type layer of the device 15b** adjacent to the auxiliary region B as shown.

The semiconductor device 15b is turned on by applying an appropriate trigger signal between gate 16 and either cathode 45c or another control lead 53 attached to an ohmic contact (shown dotted in FIG. 6) that may be connected to the exposed surface of the auxiliary region B if desired. When turned on either way, load current will initially traverse the auxiliary region B, concentrating relatively close to the P-type layer adjoining this region. This current actually passes along the surface of the adjoining P-type layer to bridge the gap formed in the auxiliary region B of the N-type end layer *and* [. As a result,] a significant fraction [of the load current] is [encouraged] *forced* immediately to [transfer to] *follow* a path through the adjoining layer and through the rectifying junction between that layer and the main region A of the end layer, *thereby acting* [. The transferred fraction of current acts] as a relatively high-current trigger signal for the portion of the device 15b subtending the cathode 45c.

Figure 8:
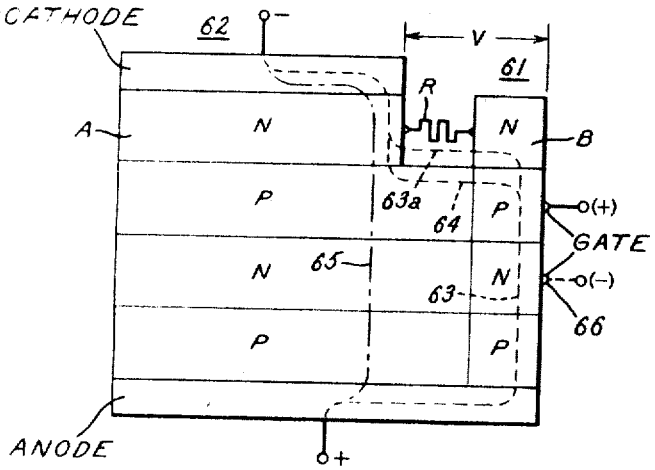
FIG. 8 is a hybrid diagram of a semiconductor device embodying the invention in its preferred form.

The double-triggering turn-on process of an SCR embodying our invention in any of its various forms can be clearly visualized with the aid of FIG. 8. In essence our SCR comprises two NPNP devices 61 and 62 in side-by-side parallel relationship, with corresponding layers of the two devices being interconnected. The device 61 has no cathode, and its lateral area is very small compared to that of the device 62. The N-type end region B of the device 61 is characterized by a relatively high lateral resistance depicted schematically in FIG. 8 at R, and it is located closer than any part of the corresponding end region A of device 62 to the gate which is attached to an intermediate layer of 61. (Note that the magnitude of R is infinite in the FIGS. 6–7 embodiment of the invention.)

With its anode and cathode connected in a load circuit and energized by forward voltage, the SCR is turned on by applying a relatively small trigger signal to its gate. Assuming that the gate connection is made to the P-type intermediate layer of the device, this signal is poled to increase current in the forward direction through the P-N junction at the cathode end of the SCR. (Alternatively, as is shown at 66 in FIG. 8, an N-gate may be used, in which case it would be energized by a signal that is negative with respect to the anode to increase forward current flow through the P-N junction at the anode end of the SCR.) As a result the SCR is triggered, and it quickly starts conducting load current of much higher magnitude.

The SCR will start to conduct load current only in a pinpoint area adjacent to the gate, as is illustrated by the broken line 63 in FIG. 8. Thus the small device 61 is turned on first, and load current necessarily traverses the end region B to reach the cathode as indicated by the horizontal segment 63a of the line 63. To the extent this current initially flows through the lateral resistance R of region B, a voltage drop V develops thereacross and a potential difference of substantial magnitude will appear between the region A and the edge of region B that is closest to the gate. By "substantial magnitude" we contemplate a magnitude of approximately 20 volts or higher, it being understood that the actual magnitude of V depends in part on external circuit parameters.

The lateral resistance R *of region B* forces a significant fraction of the load current [63*a* initially traversing the region B] to immediately transfer to a parallel path 64 comprising the adjoining P-type layer and the P-N junction between it and the N-type end region A of the device 62. The transferred current appears to the device 62 like a relatively large trigger signal, and as a result the device 62 is peremptorily turned on. Load current will now transfer abruptly from the initially triggered pinpoint area 63 to a broader area portion of the SCR adjacent to a peripheral section of the end region A, as is illustrated by the dot-dash line 65 in FIG. 8. At this time the potential difference V becomes negligible, and load current begins rapidly to spread laterally across the whole area of the device 62.

The above-described two-step double-triggering action reduces localized heating in SCR's subjected to relatively high turn-on di/dt duty. The initially triggered pinpoint area 63 conducts current for a shorter time than in prior art SCR's. Furthermore, the momentarily developed potential difference V will effect a reduction in voltage across the load circuit inductance, thereby limiting the initial rate of rise of the current being conducted, and it reduces by a like amount the voltage impressed across the small-area region represented by the vertical line 63 in FIG. 8. All of these factors contribute to less heat generation at 63. No hot spots will develop when load current is transferred to the broad-area region 65 by the second triggering action, and during the subsequent current spread the voltage across the SCR will be relatively low.

Since localized hot spot heating is minimized during each turn-on process, our SCR's are capable of improved turn-off performance when used in high switching frequency applications.

As mentioned hereinbefore, our invention is applicable to SCR's having either a P-gate or an N-gate. Furthermore, the invention can be practiced in 3-electrode semiconductor devices having all conductivity types and polarities reversed from those shown in FIG. 8. It should be understood therefore that the invention applies generally to gate-controlled multilayer semiconductor switching devices.

Figure 9:
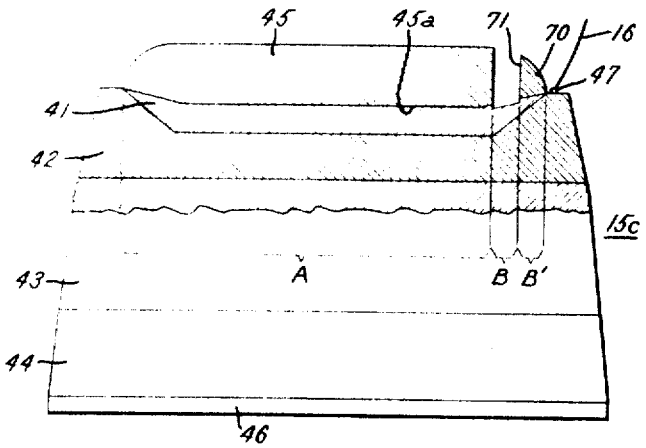
FIG. 9 is an elevational view, similar to FIG. 3, of a modified form of our invention.
Figure 10:
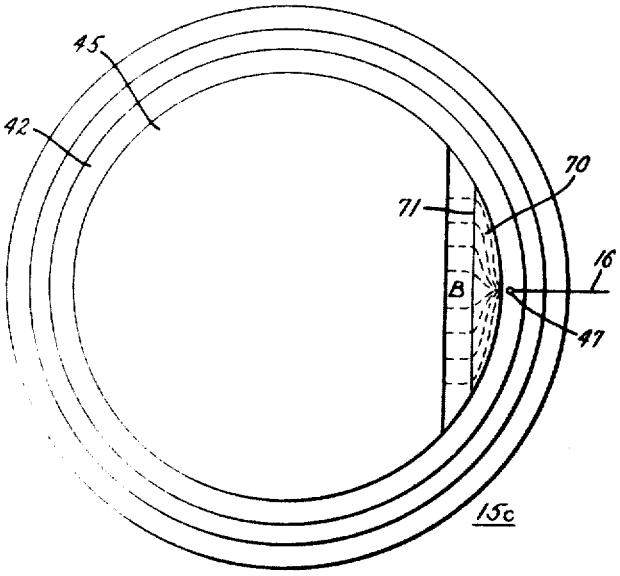
FIG. 10 is a plan view of the device shown in FIG. 9.

In the modified device 15c shown in FIGS. 9 and 10, the cathode-less region of the circular end layer 41 of the silicon wafer has two contiguous parts B and B′. Part B is a chordally disposed strip of relatively high lateral resistance similar to the auxiliary region that is identified by the same reference character in FIGS. 3 and 4. But unlike that region, this part is separated from the gate contact 47 by an adjoining peripheral segment B′ of the end layer 41. The part B′ is seen in FIGS. 9 and 10 to be disposed in uniformly spaced relation to the border between part B and the main region A of the end layer, and there is a coextensive segment of highly conductive metal 70 such as gold ohmically joined to the upper surface thereof. The overlaying segment 70 is remote from the main electrode 45 and forms no part thereof, although as a matter of manufacturing convenience it can be an island of the same material isolated from 45 by an etching process. To prevent accidental contact with the electrode 45, the island 70 can be covered with room temperature-vulcanizing rubber insulation (not shown).

As is clearly shown in FIGS. 9 and 10, the inner edge 71 of the electroconductive island 70 is parallel to the adjacent edge of the cathode 45. The electrical conductivity of 70 is so much higher than that of the silicon part B′ over which it lays that when the device 15c starts conducting load current a substantially equipotential difference V is developed along the entire length of the edge 71 with respect to the adjacent border of the main part A of the device's end layer 41. Consequently, current initially traversing the auxiliary region of the end layer 41 between the cathode 45 and the pinpoint area of turn-on near the gate contact 47 will tend to spread out as represented by the broken lines in FIG. 10. This improved current distribution ensures the early transfer of load current in the silicon wafer to a broad area portion subtending a substantial width of the cathode 45, whereby the turn-on di/dt capability of the semiconductor device is enhanced.

The last-mentioned embodiment of our invention is particularly well adapted for triggering by negative gate signals. For this purpose the gate lead 16 should be connected directly to the island 70 instead of to the ohmic contact 47 on the intermediate layer 42. When a relatively negative trigger signal is applied to the island 70, because of the relatively high resistance of part B of the end layer 41 some gate current will pass from part B′ into the adjoining layer 42 under this island, thereby firing the device 15c. As a result, a microplasma of load current will initially flow through a portion of the device subtending the island 70, which current necessarily traverses the auxiliary region B and thereby causes the desired high-speed double-triggering turn-on action already explained. We have found that such a device can also be satisfactorily turned on by applying a conventional positive gate signal to the island 70.

The increased di/dt capabilities of gate triggered controlled rectifiers constructed in accordance with our invention can also be obtained in NPNP semiconductor devices that are turned on in the forward avalanche mode. When such a device is subjected to a forward anode-to-cathode voltage equal to a predetermined breakover magnitude $V_{BO}$, it switches from a blocking to a conducting state. Conduction starts in a pinpoint area where the first microplasma occurs and then progressively spreads over the whole area of the silicon wafer. The pinpoint area of initial conduction may be in the center or near the edge of the wafer, and its location can be predicted by analyzing the impurity gradient of the silicon stock from which the wafer will be made. If the radial impurity gradient reveals a higher concentration of impurities (hence lower resistivity) at the center of the stock than at the perimeter, the area in question will be centrally located. On the other hand, if the resistivity is lowest near the perimeter, the pinpoint area of initial conduction probably will be somewhere in a peripheral portion of the wafer.

Actually a device that turns on in the forward avalanche mode can be forced to fire in either a central or a peripheral portion, as desired, by appropriately controlling its impurity gradient or its surface contour. The impurity gradient determines the relative $V_{BO}$ levels of the constituent portions of the device, while the surface contour determines the electric field strengths within these portions for a forward anode-to-cathode voltage of given magnitude. Either one of these parameters could be controlled in a device such as that shown in FIGS. 3–4 or 9–10, for example, so that the device always avalanches first only in a selected peripheral portion located in the vicinity of the gate contact 47.

Figure 11:
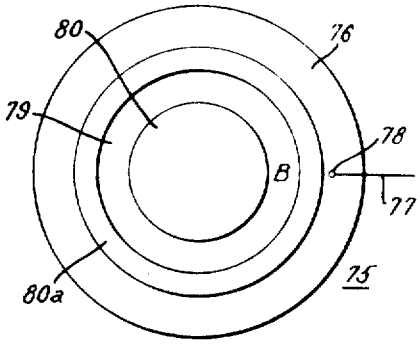
FIG. 11 is a plan view of a semiconductor device constructed in accordance with another aspect of our invention.

The improved turn-on process of our invention is obtainable in any $V_{BO}$ triggered device by providing an annular auxiliary region B in one of the end layers of the silicon wafer. This configuration of the auxiliary region was suggested hereinbefore in connection with the description of FIG. 5. In FIG. 11 a preferred form is shown for a typical device 75 that tends to break down first near its periphery.

The four-layer silicon wafer comprising the device 75 that has been illustrated in FIG. 11 has an exposed intermediate layer 76 to which a gate lead 77 is ohmically attached at 78. The only part of the circular upper layer 79 of the wafer that can be seen in this figure is the annular auxiliary region B of relatively high lateral resistance; the main region of this end layer is in contact with a circular main electrode 80 that is superimposed thereon. For reasons to be explained below, an annular island of electroconductive material 80a spaced apart from the main electrode 80 overlies a corresponding peripheral part of the end layer 79. The island 80a is therefore disposed between the annular auxiliary region B and the gate contact 78. It will be apparent that any radial cross section of the semiconductor device 75 shown in FIG. 11 will be similar to the right half of the device 15c shown in FIG. 9.

When the device 75 is turned on by raising it anode voltage to $V_{BO}$ it starts to conduct load current only in a pinpoint area that will be located somewhere along its peripheral edge outside the perimeter of the annular auxiliary region B of the end layer 79. This current must initially traverse the relatively high resistance auxiliary region B to reach the main electrode 80, and a significant fraction of it immediately transfers to a parallel path including the rectifying junction that is formed between the main region of the end layer 79 and the adjoining layer 76 of the wafer. The transferred current will act as a preemptory trigger signal for the portion of the wafer lying under the electrode 80, whereby the desired two-step, double-triggering turn-on process is obtained.

The annular island 80a of gold that is disposed on the peripheral part of the end layer 79 of the device 75 improves the distribution of initial conduction through the auxiliary region B by enabling current to widely spread out from the pinpoint area of turn-on, whereby the second step of the turn-on process begins at a very broad area of the wafer subtending substantially the whole perimeter of the main electrode 80. This will expedite current spread in the device during the turn-on process. The metal 80a also serves the useful purpose of preventing the exposed edge of the P-N junction between the silicon layers 76 and 79 from being adversely affected by the manufacturing process (e.g., etching) that is used to remove the main electrode from and to reduce the thickness of the annular auxiliary region B of the end layer 79.

Figure 12:
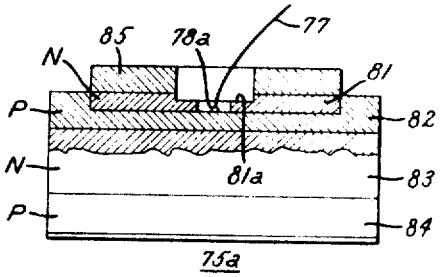
FIGS. 12 and 13 are elevational and plan views, respectively, of yet another embodiment of the invention.
Figure 13:
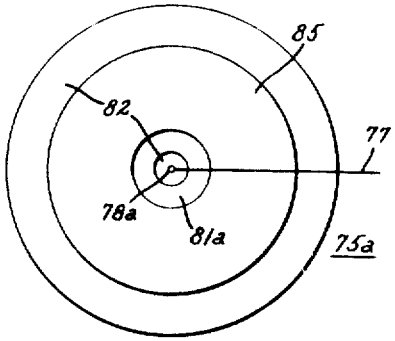

If the $V_{BO}$ triggered device were known to breakover first at its center, a ring-like main electrode with an inboard, relatively high lateral resistance auxiliary region in the associated end layer of the silicon wafer should be used. Such a device could have an eccentric gate contact similar to that shown at 48 in FIG. 5, or it could be provided with an annular auxiliary region and a concentric gate as is shown in FIGS. 12 and 13. The latter figures reveal an NPNP semiconductor device 75a comprising a silicon wafer of four layers 81, 82, 83, and 84, with a ring-like cathode 85 being connected to a conforming face of the main region of the N-type end layer 81. Extending inwardly beyond the inner perimeter of the cathode 85 is a annular, relatively thin auxiliary region 81a of the end layer 81. Inside this region the adjoining intermediate layer 82 of the wafer is exposed for connection to the gate lead 77 at a centrally disposed contact 78a. With this arrangement the previously described double-triggering turn-on process is obtained regardless of whether switching is initiated by gate triggering or by anode triggering.

It will be apparent to those skilled in the art that the FIGS. 12–13 form of our invention could be modified by adding an isolated gold overlay (not shown) to a part of the auxiliary region 81a that is spaced apart from the main region of the end layer 81. This overlay would serve the same useful purposes as the island 80a of the previously described FIG. 11 embodiment of our invention. If a negative gate signal were used, the inboard auxiliary region can be solid instead of annular, and the gate lead can be connected directly to the added electroconductive material overlaying the central part of this region.

The improved turn-on process that is obtained in the embodiments of our invention shown in FIGS. 11–13 will enable these devices to operate successfully at a substantially higher di/dt rating than has heretofore been possible in prior art $V_{BO}$ triggered devices. This result is particularly advantageous in high voltage applications where a string of series-connected SCR's is used to switch a relatively high voltage circuit. Although trigger signals are simultaneously applied to the gates of all of the SCR's in such a string, some of the devices may not turn on as fast as others. Therefore there is a real possibility that at least the slowest SCR will be turned on in its forward avalanche mode. The increased turn-on di/dt rating of devices constructed in accordance with our invention will obviously improve the di/dt capabilities of the combined string of devices in this setting.

While various alternative forms of our invention have been shown and described in detail by way of illustration, other modifications will probably occur to those skilled in the art. We therefore contemplate by the concluding claims to cover all such modifications as fall within the true spirit and scope of the invention.

What we claim as new and desire to secure by Letters Patent of the United States is:

[1. A controlled rectifier comprising:

(a) first and second main electrodes having spaced-apart contact surfaces;

(b) a body of semiconductive material disposed between said electrodes, said body having at least three layers arranged in succession with contiguous layers being of different conductivity types, whereby rectifying junctions are formed between contiguous layers of the body; and (c) a control electrode;

(d) the contact surface of said first main electrode being connected to a predetermined end layer of said body, the contact surface of the second main electrode being connected to the opposite end layer of said body, and said control electrode being connected to an intermediate layer of said body;

(e) said predetermined end layer comprising a main region having a surface that is contiguous and substantially coextensive with the contact surface of said first main electrode and a relatively small auxiliary region disposed laterally adjacent to said main region between said main region and said control electrode connection, both of said regions being contiguous with the intermediate layer of said body that adjoins said predetermined end layer;

(f) said auxiliary region being so constructed and arranged that, upon energization of the control electrode by a trigger signal to turn on the rectifier, load current will initially traverse said auxiliary region and a significant fraction thereof will immediately transfer to a path through said adjoining layer and through the rectifying junction between said adjoining layer and the main region of said predetermined end layer, whereby said fraction of load current bypasses said auxiliary region and acts as a relatively high-current trigger signal for the portion of said body subtending the contact surface of said first main electrode.]

[2. A controlled rectifier comprising:

(a) first and second main electrodes having spaced-apart contact surfaces;

(b) a wafer of semiconductive material disposed between said electrodes, said wafer having four layers arranged in succession with contiguous layers being of different conductivity types; and (c) a control electrode;

(d) the contact surface of said first main electrode being connected to a predetermined end layer of said wafer, the contact surface of the second main electrode being connected to the opposite end layer of the wafer, and said control electrode being connected to one of the intermediate layers of said wafer;

(e) said predetermined end layer comprising a main region having a surface that is contiguous and substantially coextensive with the contact surface of said first main electrode and an adjacent auxiliary region that extends laterally at least two mils from said main region, said auxiliary region being located closer than any part of said main region to said control electrode connection and being characterized by a lateral resistance appreciably higher than that of any part of said main region of corresponding lateral dimension.]

[3. A semiconductor device comprising:

(a) first and second main electrodes having spaced-apart contact surfaces;

(b) a body of semiconductive material disposed between said electrodes, said body having a plurality of layers arranged in succession with contiguous layers being of different conductivity types, a predetermined end layer of the body being connected to the contact surface of the first main electrode and the opposite end layer of the body being connected to the contact surface of the second main electrode; and (c) a control electrode connected to an intermediate layer of the body;

(d) said predetermined end layer comprising a main region having a surface that is contiguous and substantially coextensive with the contact surface of said first main electrode and a relatively small auxiliary region disposed laterally adjacent to said main region between said main region and said control electrode connection, said auxiliary region being so constructed and arranged that upon energization of the control electrode to turn on the semiconductor device a potential difference of substantial magnitude initially will develop between said main region and the edge of said auxiliary region that is closest to said control electrode connection.]

[4. A relatively high-current semiconductor device comprising:

(a) a pair of main electrodes having parallel, spaced-apart contact surfaces, the contact surfaces of a predetermined one of said main electrodes being asymmetrical;

(b) a wafer of semiconductive material disposed between said electrodes and having a plurality of circular layers arranged in succession with contiguous layers being of different conductivity types, a predetermined end layer of the wafer being connected to the asymmetrical contact surface of said predetermined main electrode and the opposite end layer of the wafer being connected to the contact surface of the other main electrode; and (c) a control electrode connected to an intermediate layer of said wafer;

(d) said predetermined end layer comprising a main region having a major face that substantially conforms to and is contiguous with the whole area of said asymmetrical contact surface and an adjacent auxiliary region located between said main region and said control electrode connection, said auxiliary region being free of main electrode connections.

[5. A relatively high-current semiconductor device comprising:

(a) a pair of main electrodes having parallel, spaced-apart contact surfaces;

(b) a wafer of semiconductive material disposed between said electrodes and having a plurality of layers arranged in succession with contiguous layers being of different conductivity types, a predetermined end layer of the wafer being connected to the contact surface of one of said main electrodes and the opposite end layer of the wafer being connected to the contact surface of the other main electrode;

(c) a control electrode connected to an intermediate layer of said wafer; and (d) said predetermined end layer comprising a main region having a surface that is contiguous with the whole area of the contact surface of said one main electrode and an adjacent auxiliary region located between said main region and said control electrode connection, said auxiliary region being characterized by a surface discontinuity with respect to said main region whereby load current initially traversing the auxiliary region upon energization of said control electrode to turn on the semiconductor device is concentrated relatively close to the intermediate layer of said body adjoining the auxiliary region.]

6. A silicon controlled rectifier comprising:

(a) a pair of main electrodes having spaced-apart contact surfaces;

(b) a body of silicon disposed between said electrodes, said body having a plurality of relatively thin layers arranged in succession with contiguous layers being of different conductivity types and each of the end layers being connected to the contact surface of a corresponding one of said electrodes; and (c) a control electrode connected to an intermediate layer of the body;

(d) one of said end layers having a portion of reduced thickness extending laterally *approximately one-sixteenth inch* beyond the associated contact surface, said laterally extending portion being no more than 90 percent as thick as the adjoining portion of said one end layer and having a distal edge that is the part of said one end layer closest to said control electrode connection.

7. A semiconductor device comprising:

(a) a pair of main electrodes having spaced-apart contact surfaces;

(b) a body of semiconductive material disposed between said electrodes, said body having a plurality of layers arranged in succession with contiguous layers being of different conductivity types and each of the end layers being connected to the contact surface of a corresponding one of said electrodes;

(c) a control electrode connected to an intermediate layer of the body; and (d) one of said end layers having a portion that is laterally displaced with respect to the associated contact surface and that is electrically isolated from the main electrode to which the other end layer is connected, said portion being separated from the remainder of said one end layer by a gap and being disposed closer than said remainder to said control electrode connection, said body being so constructed and arranged that upon energization of said control electrode to turn on the semiconductor device, a substantial potential difference initially will develop across said gap.

[8. A semiconductor device comprising:

(a) a pair of main electrodes having parallel, spaced-apart contact surfaces, the contact surface of a predetermined one of said main electrodes being noncircular;

(b) a silicon wafer disposed between said electrodes having a plurality of circular layers arranged in succession with contiguous layers being of different conductivity types, a predetermined end layer of the wafer being connected to the noncircular contact surface of said predetermined main electrode and the opposite end layer of the wafer being connected to the contact surface of the other main electrode;

(c) a control electrode connected to an intermediate layer of said wafer; and (d) said predetermined end layer comprising a main region having a major face that is contiguous with the whole area of said noncircular contact surface and an auxiliary region disposed laterally adjacent to the main region between it and said control electrode connection, said auxiliary region being free of main electrode connections and being so constructed and arranged that upon energization of the control electrode to turn on the semiconductor device a potential difference of substantial magnitude initially will develop between said main region and the edge of said auxiliary region that is closet to said control electrode connection.]

[9. A semiconductor device comprising:

(a) a pair of main electrodes having parallel, spaced-part contact surfaces, the contact surface of a predetermined one of said main electrodes being noncircular;

(b) a silicon wafer disposed between said electrodes having a plurality of circular layers arranged in succession with contiguous layers being of different conductivity types, a predetermined end layer of the wafer being connected to the noncircular contact surface of said predetermined main electrode and the opposite end layer of the wafer being connected to the contact surface of the other main electrode; and (c) a control electrode connected to an intermediate layer of said wafer;

(d) said predetermined end layer comprising a main region having a major face contiguous with the whole area of said noncircular contact surface and an auxiliary region disposed laterally adjacent to the main region between it and said control electrode connection said auxiliary region being free of main electrode connections and being characterized by a surface discontinuity with respect to said main region.]

10. The device set forth in claim 9 in which said surface discontinuity is formed by making the auxiliary *region* thinner than the main region.

11. A controlled rectifier comprising:

(a) a pair of main electrodes having spaced-apart contact surfaces;

(b) a four-layer NPNP wafer of silicon disposed between said electrodes, each of the end layers of the wafer being connected to the contact surface of a corresponding one of said electrodes;

(c) first and second control electrodes connected to an intermediate layer of the wafe;

(d) one of said end layers comprising a main region subtending the entire contact surface of the corresponding main electrode and first and second auxiliary regions extending laterally from the main region, the first auxiliary region being disposed between said main region and said first control electrode connection, the second auxiliary region being disposed between said main region and said second control electrode connection; and (e) each of said auxiliary regions being characterized by a lateral resistance appreciably higher than that of any part of said main region of the same lateral dimension.

12. A semiconductor device comprising:

(a) a pair of main electrodes having spaced-apart contact surfaces;

(b) a body of semiconductive material disposed between said electrodes, said body having a plurality of relatively thin layers arranged in succession with contiguous layers being of different conductivity types and each of the end layers being connected to the contact surface of a corresponding one of said electrodes;

(c) a first control electrode connected to an intermediate layer of the body;

(d) one of said end layers having a predetermined portion of reduced thickness extending laterally beyond the associated contact surface, said predetermined portion having a distal edge that is the part of said one end layer closet to said first control electrode connection; and (e) second and third conductively interconnected [connected] control electrodes connected at different positions to the intermediate layer of the body adjoining said one end layer, one of said positions being disposed adjacent to said distal edge of said predetermined portion of said one end layer.

13. A controlled rectifier comprising:

(a) first and second main electrodes having spaced-apart contact surfaces, (b) a wafer of semiconductive material disposed between said electrodes, said wafer having four layers arranged in succession with contiguous layers being of different conductivity types;

(c) a control electrode, (d) the contact surface of said first main electrode being connected to a predetermined end layer of said wafer, the contact surface of said second main electrode being connected to the opposite end layer of the wafer, and said control electrode being connected to one of the intermediate layers of said wafer;

(e) said predetermined end layer comprising a first part having a surface that is contiguous [and substantially coextensive] with the contact surface of said first main electrode, an adjacent second part extending laterally from a border of said first part, and a third part adjoining said second part in substantially uniformly spaced relation to said border, said second part being located closer than said first part to said control electrode connection and said third part being located between said second part and said control electrode connection; and (f) electroconductive material overlaying said third part of said predetermined end layer remote from said first main electrode.

14. The rectifier of claim 13 in which said predetermined end layer is circular and said second part thereof is a chordally disposed strip of semiconductive material having a lateral resistance appreciably higher than that of any section of corresponding lateral dimension in said first part of said predetermined end layer.

15. A controlled rectifier comprising:

(a) first and second main electrodes having spaced apart contact surfaces;

(b) a wafer of semiconductive material disposed between said electrodes, said wafer having four layers arranged in succession with contiguous layer being of different conductivity types;

(c) means for connecting the contact surface of said first main electrode to a predetermined end layer of said wafer and means for connecting the contact surface of said second main electrode to the opposite end layer of said wafer;

(d) said predetermined end layer comprising a first part having a surface conforming to the contact surface of said first main electrode, an adjacent second part extending laterally from a border of said first part, and a third part adjoining said second part in spaced-apart relation to said first part, said second part being characterized by a lateral resestance appreciably higher than that of any section of corresponding lateral dimension in said first part;

(e) electroconductive material overlaying said third part of said predetermined end layer remote from said first main electrode; and (f) a control electrode connected to said electroconductive material.

16. In a semiconductor device adapted to conduct load current when triggered:

(a) first and second load current-carrying electrodes having space-apart contact surfaces;

(b) a body of semiconductive material disposed be tween said electrodes, said body having four layers arranged in succession with contiguous layers being of different conductivity types whereby rectifying junctions are formed between contiguous layers of the body;

(c) means for connecting the contact surface of said first electrode to a predetermined end layer of said body and means for connecting the contact surface of said second electrode to the opposite end layer of said body;

(d) said predetermined end layer comprising a circular main region having a surface that substantially conforms to the whole area of the contact surface of said first electrode and an annular auxiliary region disposed laterally adjacent to said main region, both of said regions being contiguous with the intermediate layer of said body that adjoins said predetermined end layer; and (e) an annular island of electroconductive material spaced apart from said first electrode and connected to said auxiliary region of said predetermined end layer;

(f) said auxiliary region being so constructed and arranged that, upon triggering of the device, load current will initially traverse said auxiliary region and a significant fraction thereof will immediatey transfer to a path through the adjoining layer and through the rectifying junction between said adjoining layer and the main region of said predetermined end layer, whereby said fraction of load current bypasses said auxiliary region and acts as a peremptory trigger signal for the portion of said body subtending the contact surface of said first electrode.

[17. In a semiconductor device adapted to conduct load current when triggered:

(a) first and second load current-carrying electrodes having spaced apart contact surfaces, the contact surface of said first electrode being ring-like, and (b) a body of semiconductive material disposed between said electrodes, said body having four layers arranged in succession with contiguous layers being of different conductivity types, whereby rectifying junctions are formed between contiguous layers of the body;

(c) the ring-like contact surface of said first electrode being connected to a predetermined end layer of said body and the contact surface of said second electrode being connected to the opposite end layer of said body;

(d) said predetermined end layer comprising a main region having a surface that is contiguous with the whole area of said ring-like contact surface and an inboard auxiliary region laterally adjacent to said main region, both of said regions being contiguous with the intermediate layer of said body that adjoins said predetermined end layer;

(e) said auxiliary region being so constructed and arranged that, upon triggering of the device, load current will initially traverse said auxiliary region and a significant fraction thereof will immediately transfer to a path through said adjoining layer and through the rectifying junction between said adjoining layer and the main region of said predetermined end layer whereby said fraction of load current bypasses said auxiliary region and acts as peremptory trigger signal for the portion of said body subtending said ring-like contact surface of said first electrode.]

18. The semiconductor device of claim [17] *33* in which a control electrode is connected to said intermediate layer.

19. The semiconductor device of claim 18 in which said inboard auxiliary region of said predetermined end layer is annular and circumscribes said control electrode connection.

20. In a semiconductor device adapted to conduct load current when triggered:

(a) first and second load current-carrying electrodes having spaced-apart contact surfaces;

(b) a body of semiconductive material disposed between said electrodes, said body having a plurality of layers arranged in succession with contiguous layers being of different conductivity types, whereby rectifying junctions are formed between contiguous layers of the body;

(c) a predetermined end layer of said body being connected to the contact surface of said first electrode and the opposite end layer of said body being connected to the contact surface of said second electrode;

(d) said predetermined end layer comprising a first part having a surface that is contiguous with the [whole area of the] contact surface of said first electrode, an adjacent second part extending laterally from a border of said first part, and a third part adjoining said second part in spaced-apart relation to said first part, said second part being so constructed and arranged that, upon triggering of the device, load current initially traversing it will cause a potential difference of substantial magnitude to develop between said first and third parts; and (e) an island of electroconductvie material overlaying said third part of said predetermined end layer remote from said first electrode, whereby the load current initially traversing said second part is encouraged to cross an appreciable length of the border of said first part and a significant fraction of this current is quickly transferred to a parallel path including a relatively wide area of the rectifying junction between the first part of said predetermined end layer and a contiguous intermediate layer of said body.

*21. A controlled rectifier comprising:*

*(a) a pair of main electrodes having spaced-apart contact surfaces;*

*(b) a semiconductor body disposed between said electrodes, said body having a plurality of layers arranged in succession with contiguous layers being of different conductivity types and each of the end layers being connected to the contact surface of a corresponding one of said electrodes;*

*(c) a control electrode connected to the intermediate layer of the body that is contiguous with a predetermined one of said end layers; and*

*(d) said one end layer having an auxiliary region laterally displaced with respect to the associated contact surface and electrically isolated from the main electrode to which the other end layer is connected, said auxiliary region being separated from the remainder of said one end layer by a gap, said body being so constructed and arranged that upon energization of said control electrode to turn on the rectifier the path that initially conducts load current will include the auxiliary region of said one end layer, a portion of said intermediate layer between said auxiliary region and said remainder, and the junction between said intermediate layer and said remainder.*

*22. A controlled rectifier comprising:*

*(a) a pair of main electrodes having spaced-apart contact surfaces;*

*(b) a four-layer NPNP wafer of silicon disposed between said electrodes, each of the end layers of the wafer being connected to the contact surface of a corresponding one of said electrodes;*

(c) first and second control electrodes connected to an intermediate layer of the wafer;

(d) one of said end layers comprising a main region subtending the contact surface of the corresponding main electrode and first and second auxiliary regions extending laterally from the main region, the first auxiliary region being disposed between said main region and said first control electrode connection, the second auxiliary region being disposed between said main region and said second control electrode connection; and (e) each of said auxiliary regions being characterized by a lateral resistance appreciably higher than that of any part of said main region of corresponding lateral dimension.

23. The controlled rectifier of claim 22 in which said first control electrode is adapted to be energized by a first trigger signal to turn on the rectifier, and means is provided for applying to said second control electrode a second trigger signal produced by the potential difference that initially develops between said main region and the distal edge of said first auxiliary region upon energization of said first control electrode.

24. A semiconductor device comprising:

(a) first and second main electrodes;

(b) a semiconductor body disposed between said electrodes, said body having a plurality of layers arranged in succession with contiguous layers being of different conductivity types, a predetermined end layer of the body being connected to the first main electrode and the opposite end layer of the body being connected to the second main electrode;

(c) first and second control electrodes connected to an intermediate layer of the body;

(d) said predetermined end layer comprising a main region contiguous with said first main electrode and an auxiliary region disposed laterally adjacent to said main region between said main region and said first control electrode connection, said auxiliary region being free of main electrode connections and being so constructed and arranged that upon energization of said first control electrode to turn on the semiconductor device a potential difference of substantial magnitude initially will develop between said main region and the edge of said auxiliary region that is closest to said first control electrode connection; and (e) means for applying to said second control electrode a trigger signal produced by said potential difference.

25. The device of claim 24 in which staid last-mentioned means comprises: a third control electrode connected to the intermediate layer of said body adjoining said predetermined end layer at a position adjacent to said edge of said auxiliary region, and means for conductively interconnecting said second and third control electrodes.

26. In a semiconductor device adapted to conduct load current when triggered:

(a) first and second load current-carrying electrodes having spaced-apart contact surfaces;

(b) a semiconductor body disposed between said electrodes, said body having a plurality of layers arranged in succession with contiguous layers being of different conductivity types, whereby rectifying junctions are formed between contiguous layers of the body;

(c) a predetermined end layer of said body being connected to the contact surface of said first electrode and the opposite end layer of said body being connected to the contact surface of said second electrode;

(d) said predetermined end layer comprising a first part having a surface the whole area of which is contiguous with the contact surface of said first electrode, a second part disposed laterally adjacent to a border of said first part, and a third part adjoining said second part in spaced-apart relation to said first part; and (e) an island of electroconductive material over-laying the third part of said predetermined end layer remote from said first electrode;

(f) said device being so constructed and arranged that, upon triggering thereof, the path that initially conducts load current will include said island and the second part of said predetermined end layer and at least a portion of the initial load current will flow through the rectifying junction between said first part and a contiguous intermediate layer of said body.

27. A controlled rectifier comprising:

(a) first and second main electrodes having spaced-apart contact surfaces;

(b) a body of semiconductive material disposed between said electrodes, said body having at least three layers arranged in succession with contiguous layers being of different conductivity types, whereby rectifying junctions are formed between contiguous layers of the body; and (c) a control electrode;

(d) the contact surface of said first main electrode being connected to a predetermined end layer of said body, the contact surface of the second main electrode being connected to the opposite end layer of said body, and said control electrode being connected to an intermediate layer of said body;

(e) said predetermined end layer comprising a main region and an auxiliary region laterally adjacent thereto, said main region being contiguous with both the first main electrode and the intermediate layer of said body that adjoins said predetermined end layer and said auxiliary region being free of main electrode connections, both of said regions being disposed in a current path which, upon energization of said main electrodes and application of a trigger signal to said control electrode for turning on the rectifier, conducts initial load current between said main electrodes, said path having a predetermined segment which includes said auxiliary region and extends from said main region to a rectifying junction formed between said adjoining intermediate layer and said auxiliary region, (f) said predetermined segment of said path having higher resistance to current therein than the resistance of said main region in a like numerical portion of said path, whereby an immediate and progressively greater fraction of load current transfers to an alternative path including said adjoining intermediate layer and the rectifying junction formed between said adjoining intermediate layer and said main region, said fraction of load current bypassing said auxiliary region and acting as a relatively high-current trigger signal for the portion of said body subtending said first main electrode.

28. The controlled rectifier of claim 27 in which said auxiliary region is disposed between the control electrode connection and the main region from which it laterally extends at least two mils and is characterized by a lateral resistance appreciably higher than that of said main region.

29. A semiconductor device comprising:

(a) first and second main electrodes having spaced-apart contact surfaces;

(b) a body of semiconductive material disposed between said electrodes, said body having a plurality of layers arranged in succession with contiguous layers being of different conductivity types, a predetermined end layer of the body being connected to the contact surface of the first main electrode and the opposite end layer of the body being connected to the contact surface of the seocnd main electrode; and (c) a control electrode connected to an intermediate layer of the body;

(d) said predetermined end layer comprising:

(i) a main region contiguous with both the first main electrode and the intermediate layer of said body that adjoins said predetermined end layer, a first rectifying junction being formed between said main region and said adjoining intermediate layer, and (ii) a relatively small auxiliary region located laterally adjacent to said main region and contiguous with said adjoining intermediate layer, said main and auxiliary regions being serially disposed in a current path which, upon energization of said main electrodes and application of a trigger signal to said control electrode for turning on the device, conducts initial load current between said main electrodes, said auxiliary region being included in a segment of said path extending from said main region to a rectifying junction formed between said auxiliary region and said adjoining intermediate layer;

(e) said segment having greater resistance in said current path than the resistance of said main region in said current path for developing across said segment, when initially conducting load current, sufficient potential difference for causing a magnitude of load current flow through said first rectifying junction for constituting a relatively high-current trigger signal for the portion of said body subtending said first main electrode.

30. The semiconductor device of claim 29 in which said body of semiconductive material is a silicon wafer, said plurality of layers are circular, the contact surface of said first main electrode is noncircular, said main region is contiguous with said noncircular contact surface, said auxiliary region is disposed between said main region and the control electrode connection and is free of main electrode connections, and said auxiliary region presents a resistance in relation to the resistance of said main region for a significant fraction of said load current to flow through said first rectifying junction upon application of the trigger signal to said control eelctrode.

31. A relatively high-current semiconductor device comprising:

(a) a pair of main electrodes having parallel, spaced-apart contact surfaces;

(b) a wafer of semiconductive material disposed between said electrodes and having a plurality of layers arranged in succession with contiguous layers being of different conductivity types, a predetermined end layer of the wafer being connected to the contact surface of one of said main electrodes and the opposite end layer of the wafer being connected to the contact surface of the other main electrode;

(c) a control electrode connected to an intermediate layer of said wafer; and (d) said predetermined end layer comprising a main region and an adjacent auxiliary region, said main region being contiguous with both said one main electrode and the intermediate layer of said wafer that adjoins said predetermined end layer and forming a rectifying junction with said adjoining intermediate layer, both of said regions being disposed in a current path which, upon energization of said main electrodes and application of a trigger signal to said control electrode for turning on the device, conducts initial load current between said main electrodes;

(e) said auxiliary region having a surface discontinuity with respect to the surface of said main region and being dimensioned and located in relation to said main region for directing at least a portion of the load current through said rectifying junction in sufficient magnitude for constituting a peremptory trigger signal for a relatively broad area of said wafer subtending said one main electrode.

32. The semiconductor device for claim 21 in which said semiconductive material is silicon, the contact surface of said one main electrode is noncircular, said main region has a major face contiguous with said non-circular contact surface, said auxiliary region is disposed between said main region and the control electrode connection and is free of main electrode connections, and the surface discontinuity of said auxiliary region is productive of resistance distribution for directing load current initially traversng said auxiliary region into a concentration relatively close to said adjoining intermediate layer of said wafer.

33. In a semiconductor device adapted to conduct load current when triggered:

(a) first and second load current-carrying electrodes having spaced apart contact surfaces, the contact surface of said first electrode being ring-like, and (b) a body of semiconductive material disposed between said electrodes, said body having four layers arranged in succession with contiguous layers being of different conductivity types, whereby rectifying junction are formed between contiguous layers of the body;

(c) the ring-like contact surface of said first electrode being connected to a predetermined end layer of said body and the contact surface of said second electrode being connected to the opposite end layer of said body;

(d) said predetermined end layer comprising a main region and an inboard auxiliary region laterally adjacent thereto, said main region being contiguous with both the ring-like contact surface of said first electrode and the intermediate layer of said body that adjoins said predetermined end layer, both of said regions being disposed in a current path which, upon triggering of the device, conducts initial load current between said electrodes, said path having a predetermined segment which includes said auxiliary region and extends from said main region to a rectifying junction formed between said intermediate layer and said auxiliary region, (e) said predetermined segment of said path having higher resistance to current therein than the resistance of said main region in a like numerical portion of said path, whereby, upon triggering the device, an immediate and progressively greater fraction of load current transfers to an alternative path including said intermediate layer and the rectifying junction formed between said intermediate layer and said main region, said fraction of load current bypassing said auxiliary region and constituting a peremptory trigger signal for the portion of said body subtending said ring-like contact surface of said first electrode.

34. A semiconductor device comprising:

(a) first and second main electrode haivng spaced-apart contact surfaces;

(b) a semiconductor body disposed between said electrodes, said body having a plurality of layers arranged in succession with contiguous layers being of different conductivity types, a predetermined end layer of the body being connected to the contact surface of the first main electrode and the opposite end layer of the body being connected to the contact surface of the second main electrode; and (c) a control electrode connected to an intermediate layer of the body;

(d) said predetermined end layer comprising:

(i) a main region having a surface the whole area of which is contiguous with the contact surface of said first main electrode, a first rectifying junction being formed between said main

*region and the intermediate layer of said body adjoining said predetermined end layer, and*

*(ii) a relatively small auxiliary region located laterally adjacent to said main region, said main and auxiliary regions being serially disposed in a current path which, upon energization of said main electrodes and application of a trigger signal to said control electrode for turning on the device, conducts initial load current between said main electrodes, said auxiliary region being included in a segment of said path extending from said main region to a rectifying junction formed between said auxiliary region and said adjoining intermediate layer;*

*(e) said segment having greater resistance in said current path then the resistance of said main region in said current path for developing a substantial potential difference across said segment when initially conducting load current.*

References Cited

The following references, cited by the Examiner, are of record in the patented file of this patent or the original patent.

UNITED STATES PATENTS

| | | | |
|---|---|---|---|
| 2,862,115 | 11/1958 | Ross | 317—235 X |
| 2,993,154 | 7/1961 | Goldey et al. | 317—235 |
| 3,160,800 | 12/1964 | Smart | 317—235 |
| 3,263,139 | 7/1966 | Turner | 317—235 |
| 3,277,310 | 10/1966 | Schreiner | 317—235 X |
| 3,300,694 | 1/1967 | Stehney et al. | 317—235 |
| 2,980,832 | 4/1961 | Stein et al. | 317—235 |
| 3,327,183 | 6/1967 | Greenberg et al. | 317—235 |
| 3,026,424 | 3/1962 | Pomerantz | 317—235 X |

FOREIGN PATENTS

| | | |
|---|---|---|
| 1,379,254 | 10/1964 | France. |

JAMES D. KALLAM, Primary Examiner

317—234

PO-1050
(5/69)

UNITED STATES PATENT OFFICE
CERTIFICATE OF CORRECTION

Patent No. Re-27,440 Dated July 18, 1972

Inventor(s) A. L. DeCecco, D. E. Piccone & I. Somos

It is certified that error appears in the above-identified patent and that said Letters Patent are hereby corrected as shown below:

Claim 10, line 1, - change "9" to - 31 -

Claim 23, line 1, - change "22" to - 11 -

Claim 25, line 1, - change "staid" to - said -

Claim 30, last line - change "eelctrode" to -electrode-

Claim 32, line 1, - change "for" to - of -

" " change "21" to - 31 -

Claim 33, line 24 - change "junction" to - junctions

Claim 34, (a), line 58 - change "electrode" to - electrodes.

Signed and sealed this 8th day of May 1973.

(SEAL)
Attest:

EDWARD M.FLETCHER,JR.
Attesting Officer

ROBERT GOTTSCHALK
Commissioner of Patents